United States Patent [19]

Wolf

[11] Patent Number: 4,995,214
[45] Date of Patent: Feb. 26, 1991

[54] CONNECTING ELEMENT

[75] Inventor: Johann Wolf, Scharnstein, Austria

[73] Assignee: Wolf Systembau Gesellschaft m.b.H. KG., Scharnstein, Austria

[21] Appl. No.: 262,715

[22] Filed: Oct. 26, 1988

[30] Foreign Application Priority Data

Nov. 4, 1987 [AT] Austria ............... 2916/87

[51] Int. Cl.⁵ .............................. E04C 2/38
[52] U.S. Cl. ........................ 52/657; 52/633; 52/93; 403/205; 403/403
[58] Field of Search ............ 52/657, 641, 645, 93, 52/633; 403/205, 403

[56] References Cited

U.S. PATENT DOCUMENTS

| 481,014 | 8/1892 | Duncan | 135/109 |
|---------|--------|--------|---------|
| 2,307,215 | 1/1943 | Graef | 52/93 |
| 3,414,300 | 12/1968 | Spane | 52/93 |
| 4,201,021 | 5/1980 | Aldage | 52/93 |
| 4,315,386 | 2/1982 | Clarke | 52/93 |

FOREIGN PATENT DOCUMENTS

| 525970 | 6/1956 | Canada | 52/93 |
|--------|--------|--------|-------|
| 511262 | 12/1953 | Italy | 52/641 |
| 606976 | 5/1978 | U.S.S.R. | 52/93 |
| 711245 | 1/1980 | U.S.S.R. | 52/641 |
| 734356 | 5/1980 | U.S.S.R. | 52/93 |

Primary Examiner—Henry E. Raduazo
Attorney, Agent, or Firm—Young & Thompson

[57] ABSTRACT

A connecting element for the connection of sectional steel columns with roof trusses consisting of wood and exhibiting mutually converging lateral faces, for the erection of hall constructions and the like. The roof truss (2) has an end face (17) in flush contact with the column (1) and a steel band (16) is attached to the topside of the roof truss (2) for connection with the column (1) which latter is beveled in correspondence with the slope of the roof. This steel band is connectible with the column (1) by welding or by a flange plate (15) fastened to the column (1). A haunch-shaped supporting element (18) is provided on the inside between the column (1) and the roof truss (2).

3 Claims, 1 Drawing Sheet

CONNECTING ELEMENT

The invention relates to connecting elements for beams, especially for joining series-arranged columns of wooden beams or sectional steel columns with roof trusses for the erection of hall constructions and the like, wherein the wooden beams and the roof trusses exhibit confluent (converging) side faces.

A column-roof truss connection has been known from U.S. Pat. No. 2,796,642 (C. H. Woodworth) wherein a column which exhibits converging side faces is connected to a roof truss of the same shape by means of a steel rail which is angled and threadedly attached to the outside. The ends of the beams are cut at a bevel in correspondence with the slope of the roof and rest with the ends (end faces) on a movable steel plate, which thus can be adapted to the beveled surfaces, in order to avoid splintering; the steel plate is equipped with an abutment to absorb the pressure. In this arrangement, the beams can be additionally secured on the inside by means of threadable, short legs firmly joined to the abutments.

Another joint connection has been known from U.S. Pat. No. 3,099,468 (C. E. Meyerdick). However, this structure is intended for round or rectangular beams. Furthermore, the beams must be extensively accurate in their dimensions since merely the outer ends of the external border can be pressed into place. The joint does not exhibit a separation of the two connections so that assembly at the building site is made extensively difficult.

Starting with this known state of the art, the object of this invention resides in providing beams and/or composite girders produced therefrom, which have converging side faces, or columns of sectional steel and roof trusses having converging side faces, with adaptable elements, so that they can be assembled at the building site in a simple way, and in fashioning the junction point in such a way that it conforms to the load curve.

In order to attain this object, the invention provides a connecting element for joining sectional steel columns with wooden roof trusses wherein the roof truss has an end face in flush contact with the column and wherein a steel band is fastened to the topside of the roof truss for connection with the column which latter is beveled in correspondence with the slope of the roof, this steel band being connectable to the column by means of welding or by means of a flange plate fastened to the column: and wherein haunch-shaped supporting element is provided on the inside between the column and roof truss.

In this connection, the provision is furthermore made that the leg of the supporting element in contact with the column is equipped with slotted holes for the accommodation of a screw connection with a flange of the sectional steel profile of the column; a retaining disk to support the supporting element during the establishment of the connection can be attached with the sectional steel. In this arrangement, the retaining disk is fashioned to be polyhedral in accordance with the invention, the individual edges exhibiting a differing spacing from a bore provided at the column for mounting purposes.

The invention furthermore relates to an embodiment of the connecting element for columns of wooden beams with roof trusses wherein the wooden beams and the roof trusses exhibit side faces that extend toward each other (converge), for the erection of hall buildings and the like, wherein, according to this invention, respectively one component is provided for the end of the column and the end of the roof truss, each component consisting of steel bands attached to the column and, respectively, the roof truss on the outside and inside, and wherein mutually opposed steel bands are joined by flanges projecting laterally on the outside as well as inside past the column and past the roof truss, and wherein the steel bands located on the inside are rigidified with respect to the flanges by means of connecting plates. In this arrangement, at the outer region of the flanges, flanges are provided for rigidification, the former flanges having screw holes to accommodate screws and the latter flanges having slotted holes. Finally, the steel bands are fashioned with the flanges as well as the connecting plates into respectively one single-piece component by welding at the building site.

Additional details of the invention can be seen from the following description. Two embodiments of the connecting element of this invention are schematically depicted in the drawings wherein.

Figure 1:
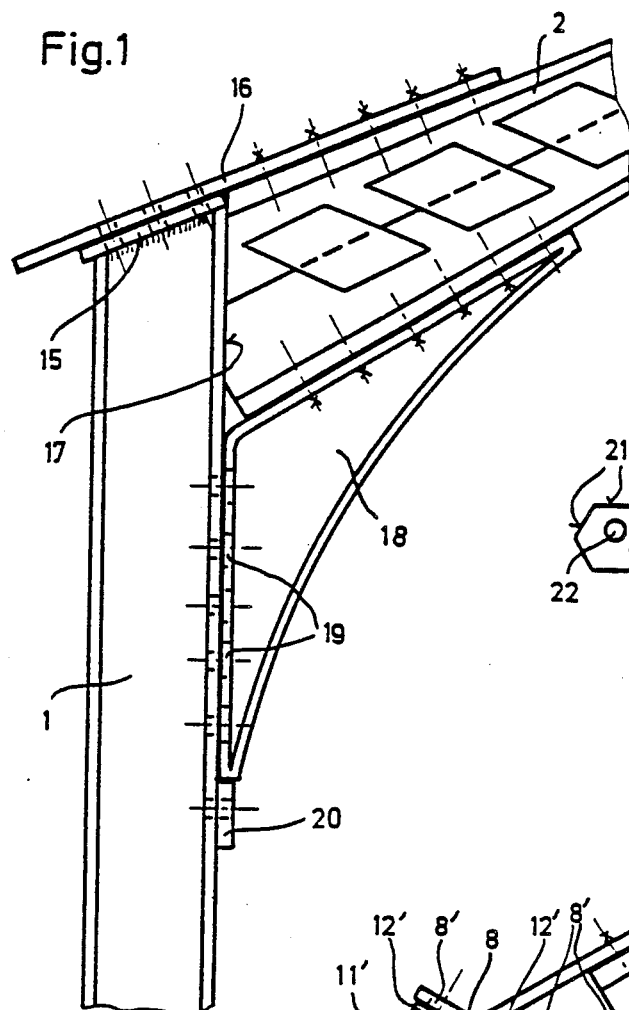
FIG. 1 shows a lateral view of a connecting element.

FIG. 1 shows a connecting element of a column 1, which latter consists of an I girder, with a composite roof truss having converging side faces 2. The sectional steel column 1 is terminated at the top by a welded-on flange plate 15 sloping in correspondence with the required roof slope. The roof truss 2 is threaded, with a steel band 16, preassembled with this roof truss, to the flange plate 15 of the column 1. The roof truss 2 is cut at such a bevel that its end face 17 is in flat contact with the column 1. In case of large objects with uniform columns 1, the steel band 16 can also be directly welded to the column if corresponding measures are taken for threaded attachment of the roof truss 2 without any problems (predrilled roof trusses and pneumatic screw tool). The steel band 16 can also be lengthened toward the outside in order to be able to attach roof projections, if desired.

Figure 2:
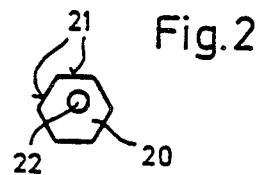
FIG. 2 shows a detail of the arrangement of FIG. 1 in lateral view.

A supporting element 18 is threaded onto the inside of the column 1 and of the roof truss 2; this element has slotted holes 19 on the column side to ensure flush contact with the roof truss 2. In order to optimally transfer the roof load into the column, the supporting element 18 is fashioned to be haunched and rigidified in correspondence with the load. The end of the haunch is fixed in place by a retaining disk 20 to prevent shifting in the slotted holes 19 along the column 1. This retaining disk is polyhedral, the edges 21 exhibiting differing distances to the bore 22 (FIG. 2), and the retaining disk can thus be mounted in contact with the haunch and can be threaded to the column 1.

Figure 3:
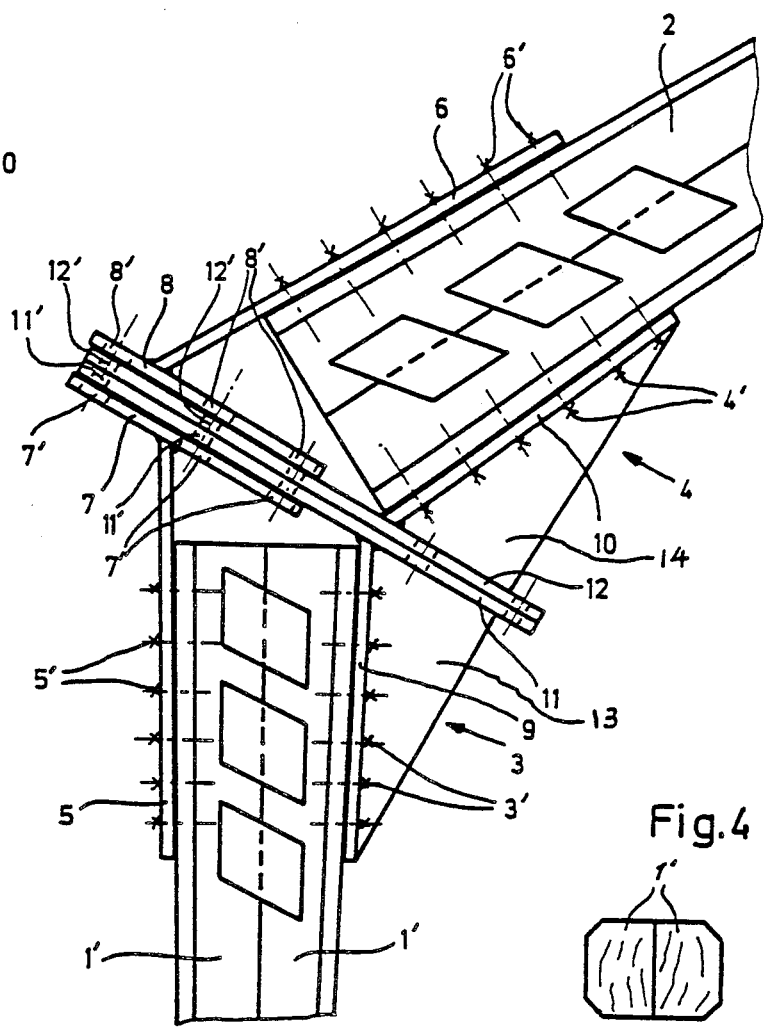
FIG. 3 shows a second embodiment of the connecting element.
Figure 4:
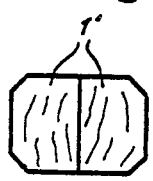
FIG. 4 is a cross section through a column.

FIG. 3 shows, in one embodiment, the connection of a composite column 1' with a composite roof truss 2, both of these parts consisting of wooden beams exhibiting side faces converging toward each other. In correspondence with the load curve, components 3 and 4 are provided at the stronger ends of the columns and roof trusses; these components consist of steel bands 5, 9 and 6, 10 in contact with the outsides and insides of the column and of the roof truss and being screwed to the column 1 and the roof truss 2 (screws 3', 4' and 5', 6').

The steel bands 5 and 6 in contact from the outside are in each case firmly joined together by means of short flanges 7 and 8 inclined in correspondence with the junction plane and exhibiting several screw holes 7' and 8'. The inwardly located steel bands 9, 10 are likewise firmly connected to long flanges 11, 12 extending over the columns 1 and the roof trusses 2, the overlapping on the inside being markedly greater than on the outside. Between the steel bands 9 and 10 and the overlapping parts of the flanges 11, 12, respectively one or several connecting plates 13, 14 are welded in place. The connecting plates can also have a U- or I-shaped configuration. In correspondence with the assumed load, or the load to be expected, the inner joint can be fashioned to be correspondingly long and rugged, thus ensuring a fixed clamping mounting of the beams, optimum support, and extensive preassembly.

The slotted holes 7', 8' corresponding to the short flanges 7, 8 are fashioned in the long flanges 11, 12 as screw bores 11', 12' in order to be able to compensate for differences in the beam thicknesses.

The aforedescribed structure has the advantage that the steel bands 5, 6, 9, and 10 can be threaded in place over the entire length in flush engagement, and therefore a firm restraint of the girder ends is achieved. Furthermore, the inner part of the joint can be designed in correspondence with the load to be expected. Due to extensive preassembly, the work at the building site is very substantially simplified.

Alternatively—especially in cases where the load is light—the connecting elements can also be fashioned so that the short flanges 7, 8 are located on the inside of the joint and form, together with the connecting plates 13, 14, a completely unitary welded or cast body.

In cases where small wood thicknesses and thus also small dimensional deviations are to be expected, for example in case of halls having a small clear span, such as boathouses or the like, the steel bands disposed on the outside and inside can be joined by means of a flange common to both of them, i.e. they can be fashioned as an integral connection element. The insertion of the columns and roof trusses in the connection, having a bifurcate shape due to the two steel bands, is facilitated by the mutually converging side faces of the beams, and flush contact can thereby likewise be attained. Within the scope of the invention, the wooden beams of the columns and of the roof trusses can be formed with respectively two mutually opposed side faces converging toward each other, but they can also be fashioned so that they are convergent on four side faces.

What is claimed is:

1. A truss having a lower end connecting elements for upright wooden columns with an included roof trusses comprising two components (3, 4) one for the upper end of said upright column (1) and the other for the lower end of said inclined roof truss (2), each component comprising a pair of mutually opposed steel bands (5, 9 and 6, 10) one pair of bands (5, 9) being attachable to opposite sides of said column (1) and the other pair of bands (6, 10) being attachable to said roof truss (2) each said pair of steel bands being joined by means of a flange (11 or 12) projecting laterally on all sides past the column (1) and the roof truss (2); means to secure said flanges to each other; and a connecting plate (13, 14) interconnecting one band of each said pair of mutually opposed bands and a said flange and disposed in a common vertical plane below said lower end of said roof truss when said flanges are secured to each other.

2. A connecting element according to claim 1 wherein each of said flanges include a region remote from said connecting plates, and each said component further comprising a rigidifying flange provided in said region for rigidifying said flanges and for accommodating said securing means.

3. A connecting element according to claim 1 wherein the pair of bands, the flange and the connecting plate of each component are secured by welding.

* * * * *